(12) United States Patent
Chaudhary et al.

(10) Patent No.: US 11,507,644 B2
(45) Date of Patent: Nov. 22, 2022

(54) DISCOVERY AND CLASSIFICATION OF SOFTWARE APPLICATION SUITES

(71) Applicant: ServiceNow, Inc., Santa Clara, CA (US)

(72) Inventors: Nehal Lalit Chaudhary, Sunnyvale, CA (US); Alexander Rangel, San Jose, CA (US); Virendra Karappa, Santa Clara, CA (US); Rohit Lobo, San Jose, CA (US); Sanjeet Singh Sahai, Mountain View, CA (US)

(73) Assignee: ServiceNow, Inc., Santa Clara, CA (US)

(*) Notice: Subject to any disclaimer, the term of this patent is extended or adjusted under 35 U.S.C. 154(b) by 514 days.

(21) Appl. No.: 16/591,245

(22) Filed: Oct. 2, 2019

(65) Prior Publication Data
US 2021/0103643 A1    Apr. 8, 2021

(51) Int. Cl.
*G06F 21/10* (2013.01)
*G06F 8/71* (2018.01)

(52) U.S. Cl.
CPC .............. *G06F 21/105* (2013.01); *G06F 8/71* (2013.01)

(58) Field of Classification Search
CPC .............. G06F 21/105; G06F 8/71; G06F 8/60
USPC .......................................................... 705/59
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |

(Continued)

OTHER PUBLICATIONS

Servicenow, "Madrid Software Asset Management" last updated Apr. 15, 2019.

*Primary Examiner* — Zeshan Qayyum
(74) *Attorney, Agent, or Firm* — Fletcher Yoder PC

(57) ABSTRACT

An embodiment may include persistent storage containing a plurality of software models and a plurality of entitlements thereto, wherein the software models include suite software models with associated downgrade rights. The embodiment may also involve: determining that a first suite software model contains a second suite software model; determining that the first suite software model is associated with a first set of downgrade rights to earlier versions thereof and the second suite software model is associated with a second set of downgrade rights to earlier versions thereof; sorting a list of the first suite software model, the earlier versions thereof, the second suite software model, and the earlier versions thereof in increasing order of version and height value; traversing the list to find a matching suite software model for a particular suite of the software applications; and assigning an entitlement for the matching suite software model to the particular suite.

20 Claims, 13 Drawing Sheets

(56) References Cited

U.S. PATENT DOCUMENTS

| | | |
|---|---|---|
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueeler |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,692,031 B2 * | 6/2020 | Carley ............... G06F 11/3457 |
| 2004/0249653 A1 * | 12/2004 | Le ........................ G06Q 10/10 |
| | | 705/59 |
| 2007/0233782 A1 * | 10/2007 | Tali ......................... G06F 8/61 |
| | | 709/220 |
| 2010/0064277 A1 * | 3/2010 | Baird ..................... G06F 8/72 |
| | | 717/120 |

* cited by examiner

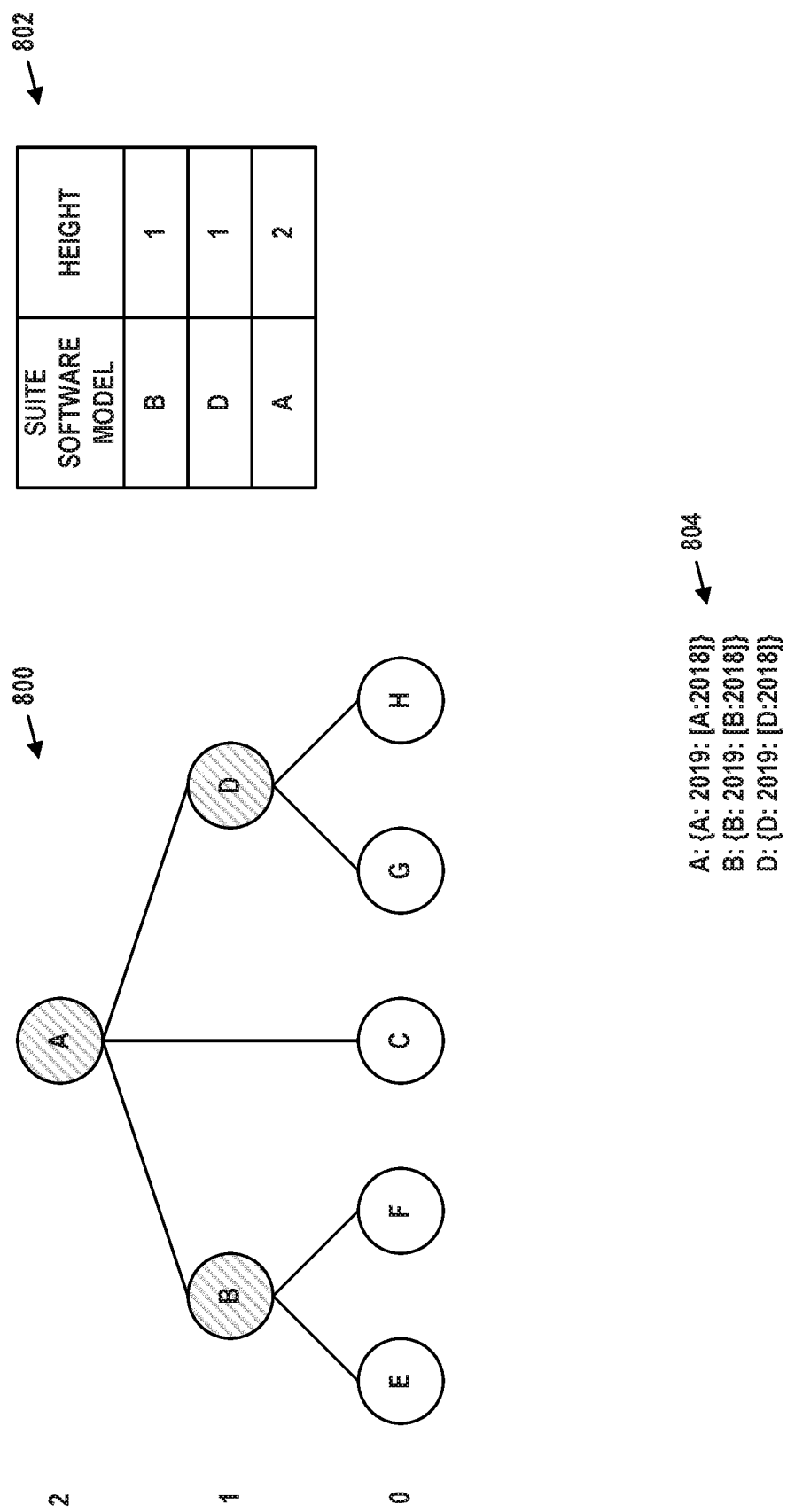

902A

| SUITE SOFTWARE MODEL | HEIGHT |
|---|---|
| SC 2019 | 1 |
| CIS 2019 | 2 |
| SC 2018 | 1 |
| CIS 2018 | 2 |
| SC 2017 | 1 |
| CIS 2017 | 2 |
| SC 2016 | 1 |
| CIS 2016 | 2 |
| SC 2013 | 1 |
| CIS 2013 | 2 |

— SORT BY HEIGHT →

902B

| SUITE SOFTWARE MODEL | HEIGHT |
|---|---|
| SC 2019 | 1 |
| SC 2018 | 1 |
| SC 2017 | 1 |
| SC 2016 | 1 |
| SC 2013 | 1 |
| CIS 2019 | 2 |
| CIS 2018 | 2 |
| CIS 2017 | 2 |
| CIS 2016 | 2 |
| CIS 2013 | 2 |

— SORT BY VERSION PER HEIGHT →

902C

| SUITE SOFTWARE MODEL | HEIGHT |
|---|---|
| SC 2013 | 1 |
| SC 2016 | 1 |
| SC 2017 | 1 |
| SC 2018 | 1 |
| SC 2019 | 1 |
| CIS 2013 | 2 |
| CIS 2016 | 2 |
| CIS 2017 | 2 |
| CIS 2018 | 2 |
| CIS 2019 | 2 |

FIG. 9B

DISCOVERY AND CLASSIFICATION OF SOFTWARE APPLICATION SUITES

BACKGROUND

Software management systems may be used to identify software applications that are installed on or executing on computing devices, map these software applications to appropriate software models that define the software applications, and then compare the extent of the deployed software applications to entitlements thereto. In some cases, entitlements and/or software models may be linked to downgrade rights—the ability to assign an entitlement to more than one version or edition of the software application. By carrying out such a mapping, an enterprise may be able to efficiently determine whether it has too many or too few entitlements to any identified software application for which a software model is available.

Many software vendors are now packaging their software applications into suites. As such, a suite may include two or more software applications that have related functionality, are thematically linked, interface with one another, or share common user interface components. Entitlements to the software applications may be provided individually, on the basis of a suite, or both.

SUMMARY

When combined with downgrade rights, the assignment of entitlements to suites and the software applications thereof becomes a significantly challenging task. Ideally, a set of entitlements are assigned so that the fewest and most restrictive (in terms of downgrade rights) cover as many suites and software applications as possible. As a result, it is difficult to determine an optimal entitlement assignment scheme for small enterprises, and virtually impossible for large enterprises.

The embodiments herein address these and possibly other issues related to discovery of suites of software applications on managed networks. In particular, these embodiments provide a unified approach for efficiently assigning entitlements to nested suites of software applications with downgrade rights. To do so, the relationships between the suites and their constituent software applications are represented in a tree, where a parent node of the tree is a suite that contains software applications or other suites represented by its child nodes. Each node representing a suite may contain or refer to an additional tree representing that suite's downgrade rights to other versions and/or editions. The information arranged in this tree of trees can be parsed into an ordered list of versions/editions of suites. Entitlements can be assigned to discovered suites by traversing the list in order until a match is found.

Accordingly, a first example embodiment may involve persistent storage containing a plurality of software models and a plurality of entitlements thereto, wherein the software models (i) define software applications by their respective manufacturers, titles, and versions, and (ii) include suite software models that define suites of the software applications, and wherein downgrade rights are respectively associated with the suite software models. The first example embodiment may also involve a server device configured to: determine that a first suite software model of the suite software models contains a second suite software model of the suite software models; associate the first suite software model with a first height value and associate the second suite software model with a second height value, wherein the first height value is greater than the second height value; determine that (i) the first suite software model is associated with a first set of downgrade rights to one or more earlier versions of the first suite software model, and (ii) the second suite software model is associated with a second set of downgrade rights to one or more earlier versions of the second suite software model; sort a list of the first suite software model, the one or more earlier versions of the first suite software model, the second suite software model, and the one or more earlier versions of the second suite software model in increasing order of version and height value; determine that a computing device disposed within a managed network has installed thereon a copy of a particular suite of the software applications; traverse the list in order to find a matching suite software model for the particular suite of the software applications; and assign, from the plurality of entitlements, an entitlement for the matching suite software model to the copy of the particular suite of the software applications.

A second example embodiment may involve determining that a first suite software model of a plurality of suite software models contains a second suite software model of the plurality of suite software models, wherein persistent storage contains a plurality of software models and a plurality of entitlements thereto, wherein the software models (i) define software applications by their respective manufacturers, titles, and versions, and (ii) include the suite software models, and wherein downgrade rights are respectively associated with the suite software models. The second example embodiment may also involve associating the first suite software model with a first height value and associate the second suite software model with a second height value, wherein the first height value is greater than the second height value. The second example embodiment may also involve determining that (i) the first suite software model is associated with a first set of downgrade rights to one or more earlier versions of the first suite software model, and (ii) the second suite software model is associated with a second set of downgrade rights to one or more earlier versions of the second suite software model. The second example embodiment may also involve sorting a list of the first suite software model, the one or more earlier versions of the first suite software model, the second suite software model, and the one or more earlier versions of the second suite software model in increasing order of version and height value. The second example embodiment may also involve determining that a computing device disposed within a managed network has installed thereon a copy of a particular suite of the software applications. The second example embodiment may also involve traversing the list in order to find a matching suite software model for the particular suite of the software applications. The second example embodiment may also involve assigning, from the plurality of entitlements, an entitlement for the matching suite software model to the copy of the particular suite of the software applications.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts nested suite of suites as a tree along with associated downgrade rights, in accordance with example embodiments.

FIG. 9B depicts sorting a list of suites per version and height in the tree of FIG. 9A, in accordance with example embodiments.

DETAILED DESCRIPTION

Figure 1:
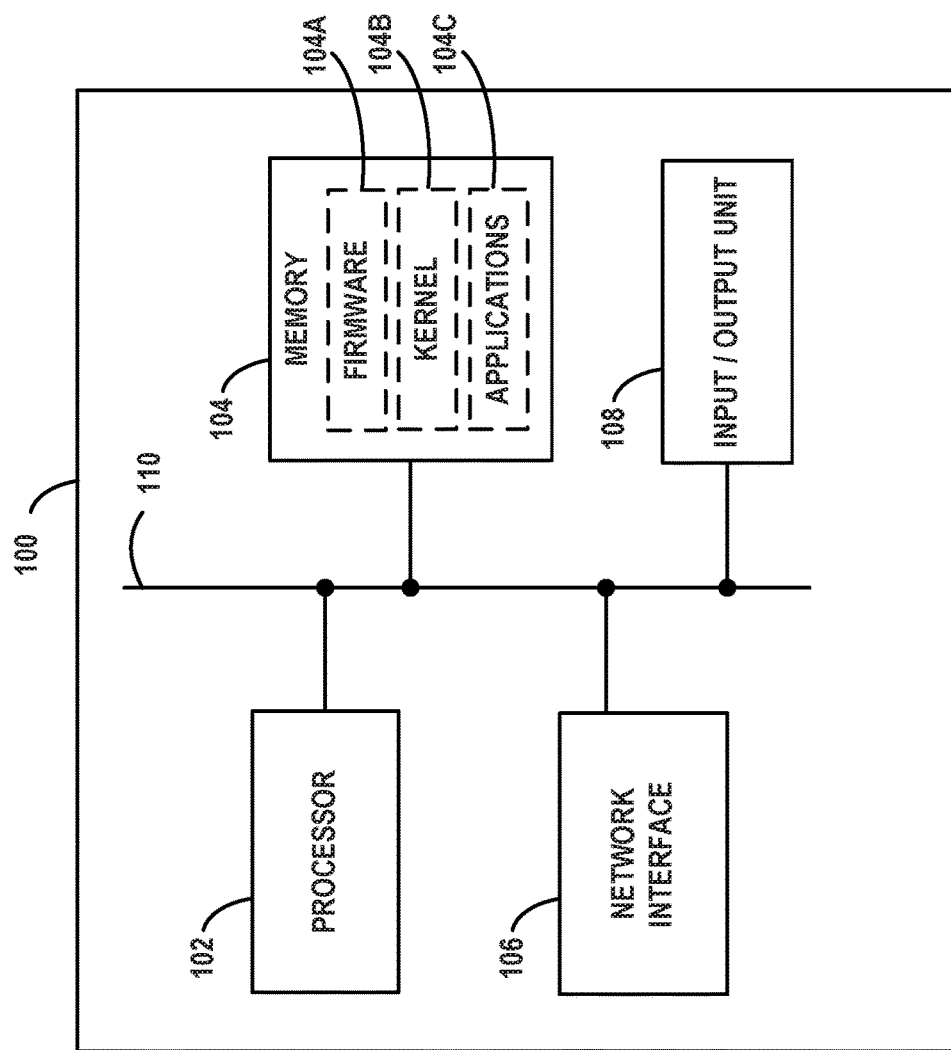
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
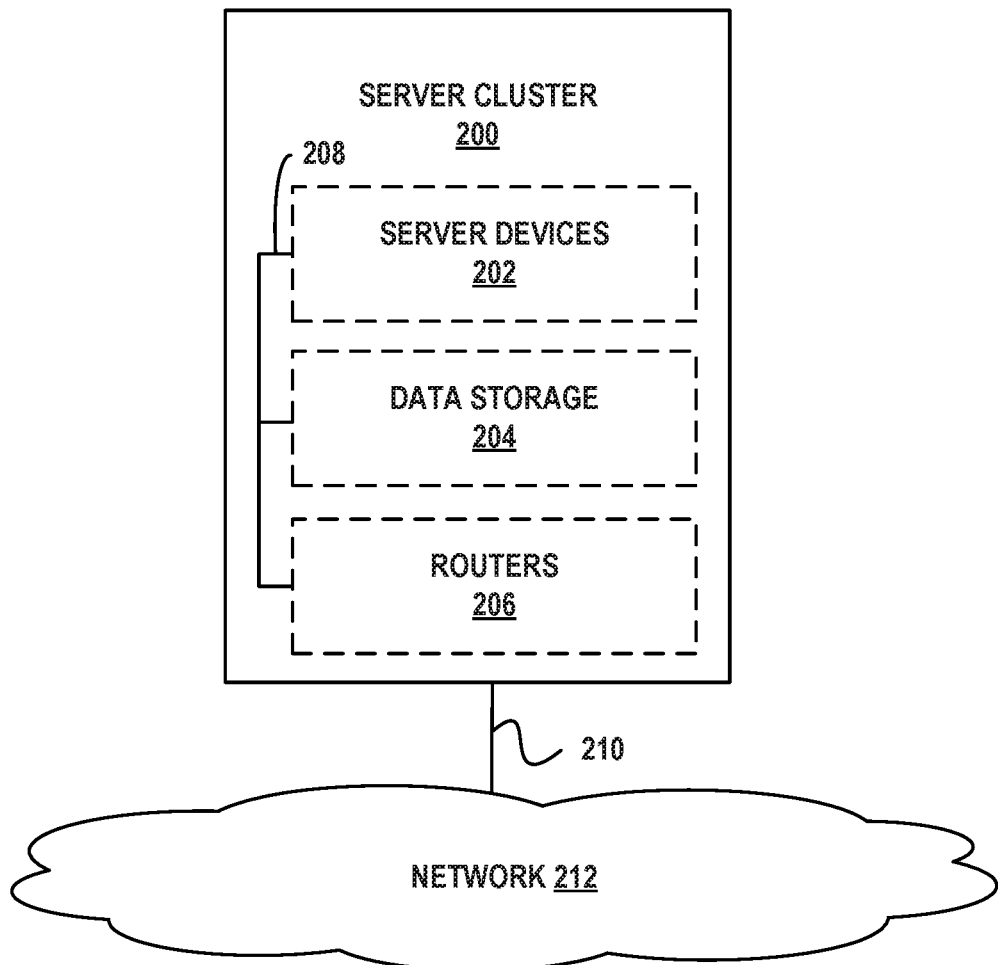
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
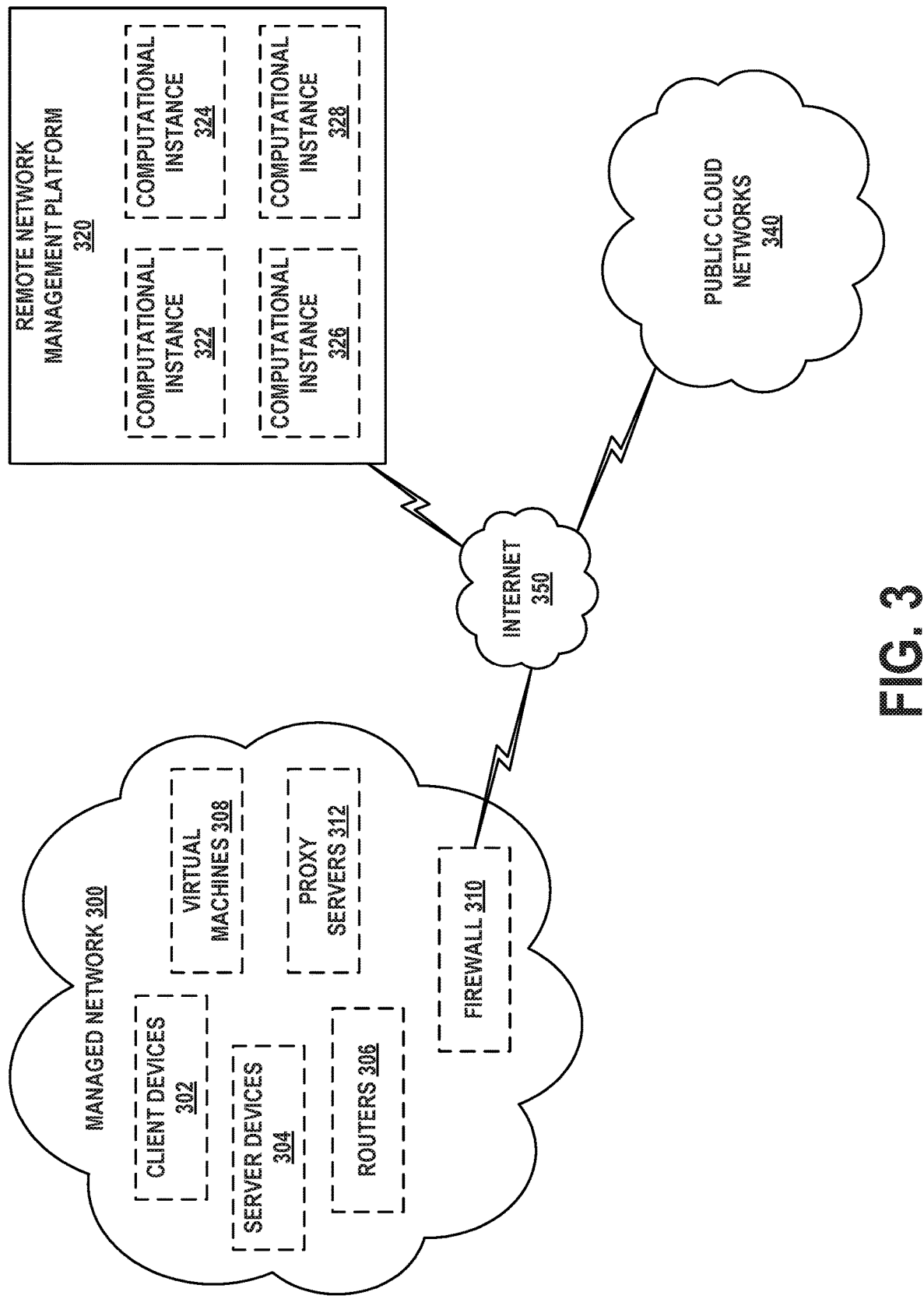
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
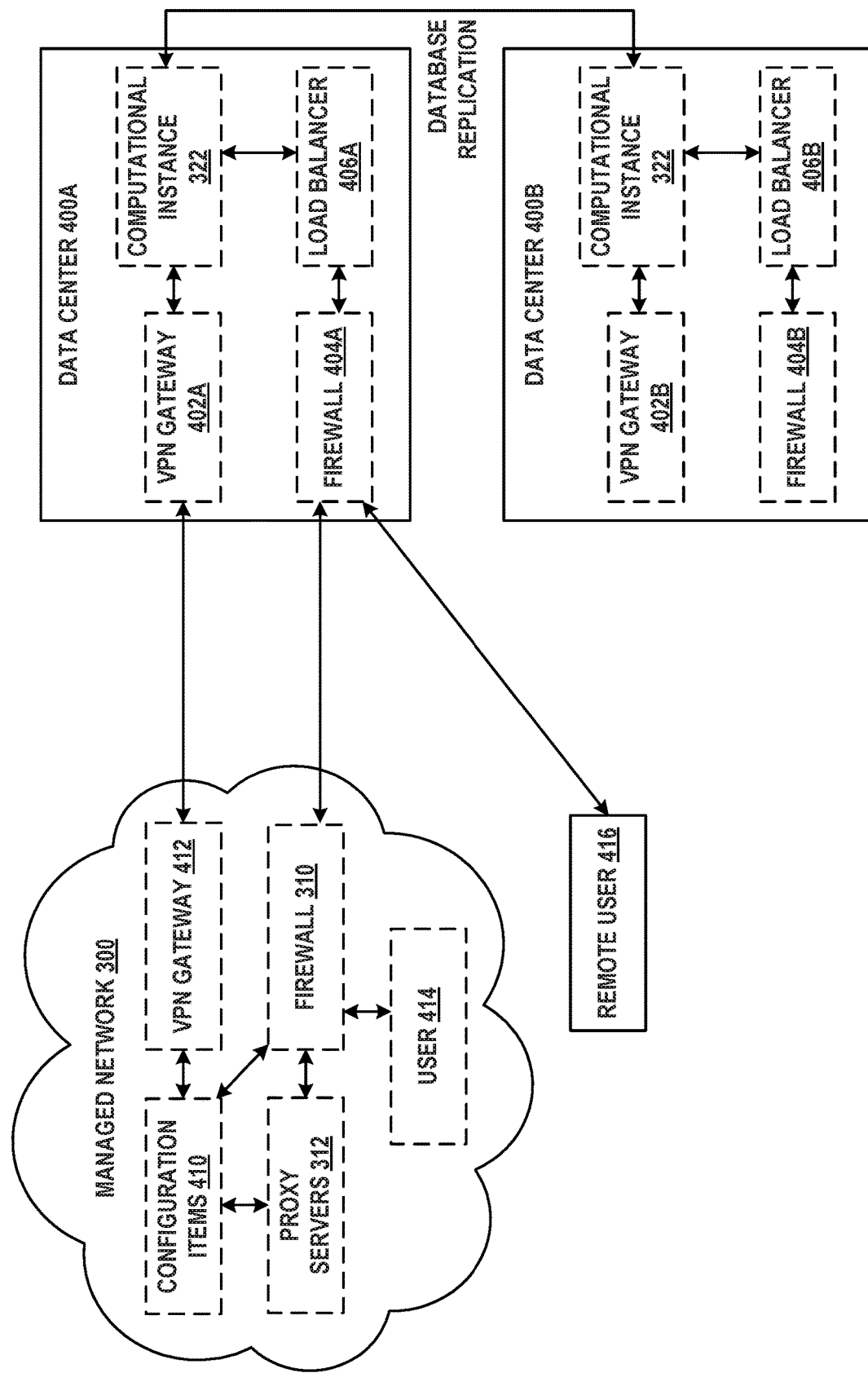
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
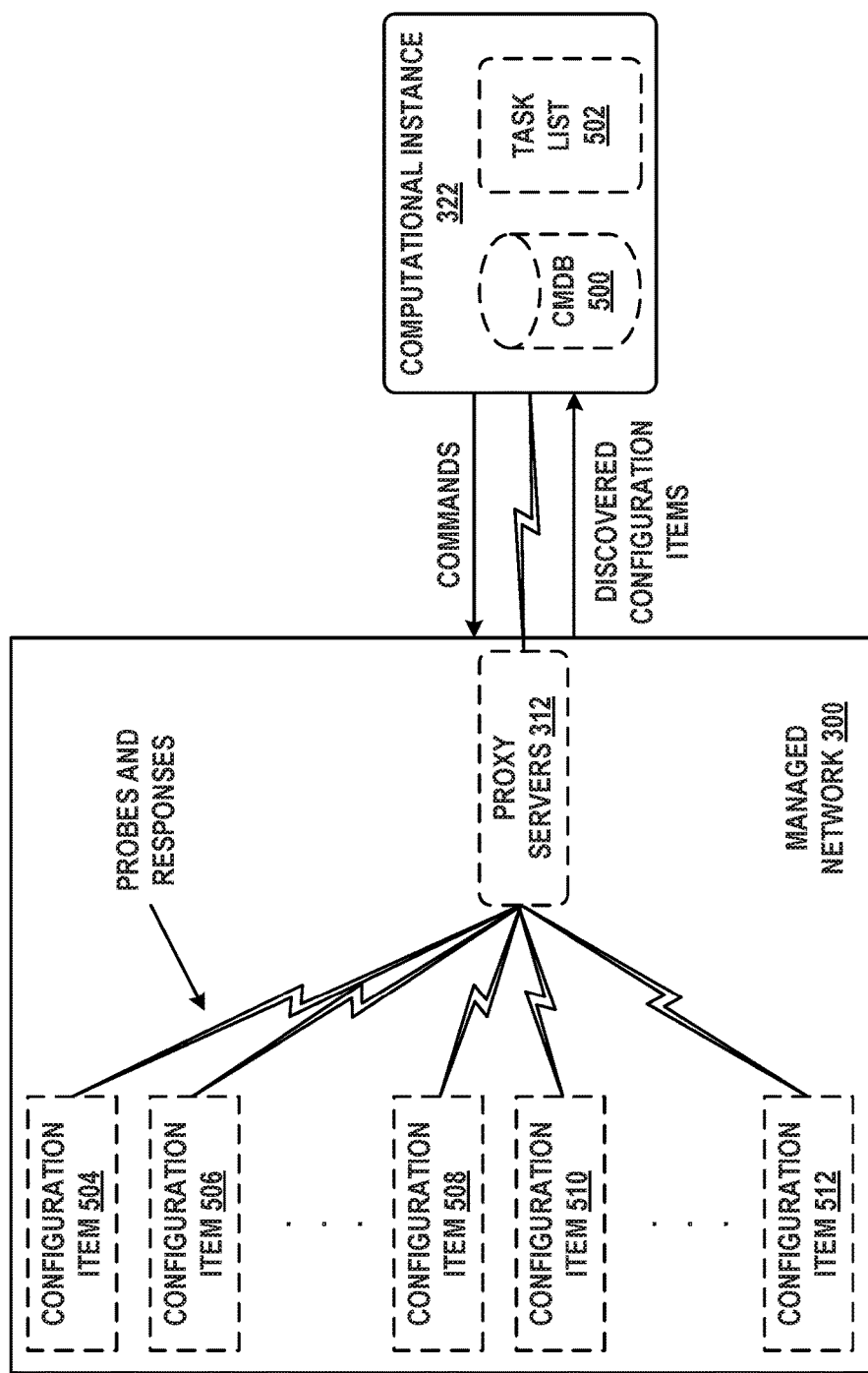
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
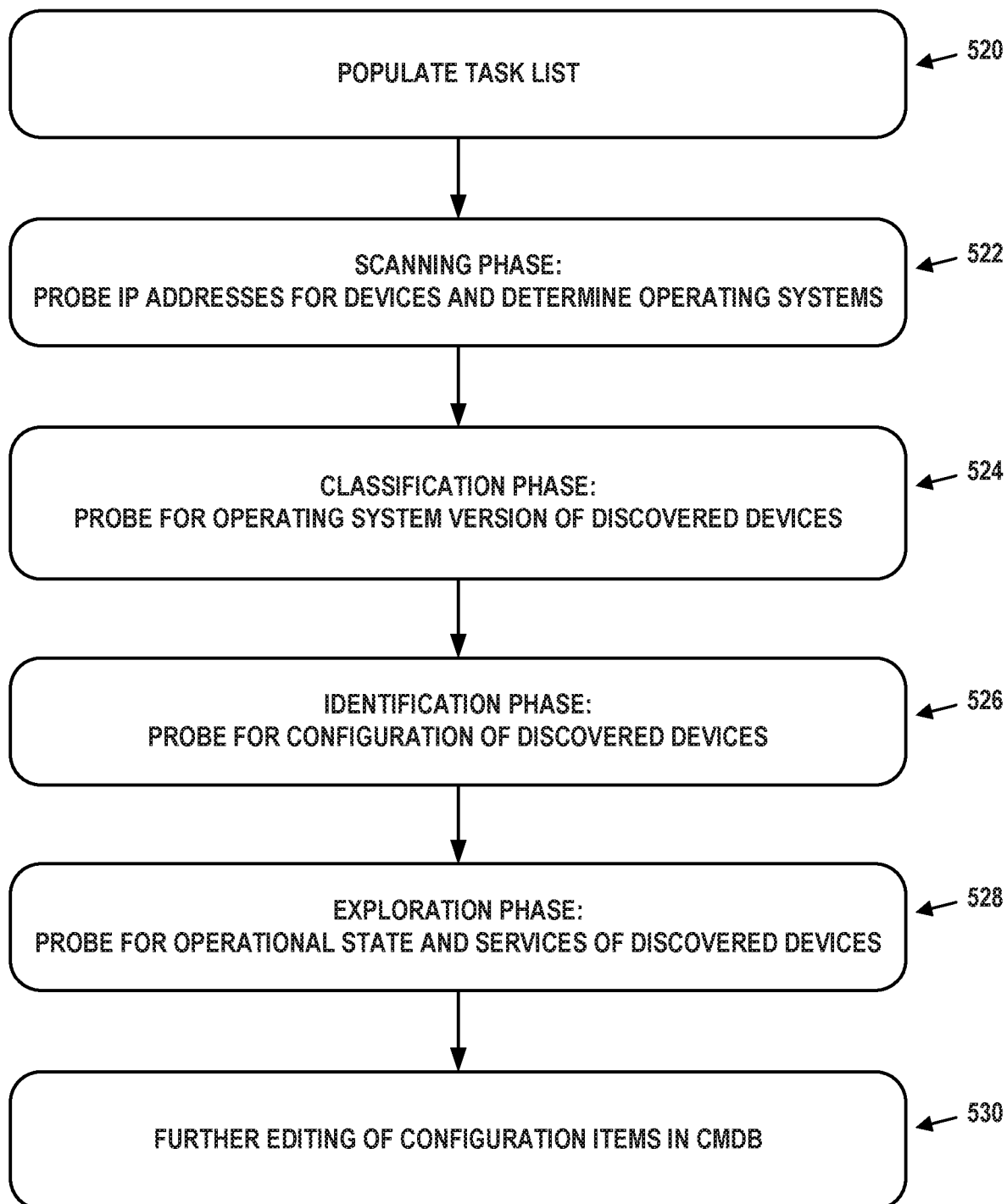
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE SOFTWARE MODELS, ENTITLEMENTS, DOWNGRADE RIGHTS, AND RECONCILIATION

The discovery procedures described above may allow computational instance 322 to determine the extent of deployment, throughout managed network 300, of various software applications. For example, software applications may be discovered or otherwise identified based on their executable file names and/or the sizes, directory paths, or dates thereof, as well as other factors such as product identifiers that may be found within configuration files.

Representations of these deployments may be stored in CMDB 500 or a similar database as configuration items, for example. Such representations may associate particular versions and/or editions of software applications to particular computing devices. These computing devices may have multiple processors and/or multiple cores per processor, which may impact how entitlements to these software applications are assigned. As noted previously, assigning entitlements for suites of software applications to installations thereof can become a prohibitively difficult task as enterprises grow. Regardless, in order to appreciate the extent of the problems solved by the embodiments herein, a discussion of software models, entitlements, and downgrade rights may be helpful.

A software model is a definition of a software application. In some cases, it may include a specification of a manufacturer (e.g., a vendor, publisher, or distributor of the software application), a name (e.g., a title of the software application), a version, and an edition. In other cases, more or fewer than these four factors may make up a software model.

As an example, MICROSOFT® Word is a word processing productivity software application available on various WINDOWS® and MACOS® platforms. Its publisher is MICROSOFT®, and its title is "Word". There are numerous versions of this software application, with more recent versions generally named after an approximate year of release, such as "2013", "2016", and "2019". These versions may also be referred with sequentially increasing numerical identifiers, such as "15.0", "16.0", and so on. Furthermore, there may be different editions of each version, e.g., one for each platform. Alternatively, the edition may not be specified, or may be ignored for the purposes herein.

Therefore, the software model for "Microsoft Word 2019 Windows" may refer to the 2019 version of Word from MICROSOFT® that operates on the WINDOWS® platform. In contrast, the software model for "Microsoft Word 2016 Mac OS" may refer to the 2016 version of Word from MICROSOFT® that operates on the MACOS® platform.

An entitlement can represent one or more software licenses—or other rights of use—for a software application. Thus, each entitlement can include a count of licenses (e.g., 1, 10, 50, etc.), and an entitlement with a count of n may be also referred to as n entitlements. An entitlement can refer to or be associated with a software model to specify the software application being licensed. As an example, 10 entitlements for "Microsoft Word 2019 Windows" may indicate that an enterprise can deploy no more than 10 copies of this software application throughout managed network 300 while remaining in compliance with these entitlements. In some cases, an enterprise may have several sets of entitlements attached to the same software model—e.g., sets of 10 entitlements, 5 entitlements, and 12 entitlements for "Microsoft Word 2019 Windows", allowing a maximum deployment of 27 installations. This may reflect how enterprises can obtain entitlements over time on an as needed basis.

Downgrade rights may also be associated with entitlements and/or a software model. These rights specify any previous releases or other editions of a software application or suite to which entitlements for the software model can be applied. For example, entitlements for "Microsoft Word 2019 Windows" may be associated with downgrade rights for "Microsoft Word 2016 Windows". In other words, each of the entitlements for "Microsoft Word 2019 Windows" may be used for installations of either "Microsoft Word 2019 Windows" or "Microsoft Word 2016 Windows", but no other versions of this software application. In some cases, downgrade rights may support multiple levels of downgrades and/or multiple paths of downgrades.

Downgrade rights may be initially associated only with entitlements. As an enterprise's entitlements are processed and mapped to software models, the downgrade rights may also be associated with the software models. In other words, when a software model for a particular entitlement is identified, the downgrade rights for that entitlement may be linked to the software model. Alternatively, software models may initially include or refer to downgrade rights. Regardless, it is possible that multiple copies of the same software model may exist, each associated with different downgrade rights from different sets of entitlements. The embodiments herein assume that downgrade rights have been associated with the appropriate software models, either by way of entitlement processing or by initial configuration.

In this context, reconciliation refers to the act of assigning entitlements to discovered software applications. Various algorithms for doing so may exist. A common goal of these algorithms may be to assign the entitlements to installations of the software applications in such a fashion that as many of these installations as possible can be covered by available entitlements. Failing to do so may result in the enterprise finding itself in an under-licensed situation where it has to purchase additional entitlements to cover all installations. Conversely, an ideal assignment may result in the enterprise determining that it is over-licensed and can save money by releasing or not renewing some entitlements. In sum, proper assignment of entitlements to installations can save a large enterprise a significant amount of licensing fees, perhaps on the order or hundreds of thousands or millions of dollars.

Downgrade rights may create situations where more than one type of entitlement can be assigned to the same installation. For example, an enterprise may have an entitlement to "Microsoft Word 2016 Windows" and another to "Microsoft Word 2019 Windows", where the latter has downgrade rights to "Microsoft Word 2016 Windows". Either may be assigned to an installation of "Microsoft Word 2016 Windows". Reconciliation algorithms may assign the most restrictive applicable entitlements in such cases. In this example, the entitlement for "Microsoft Word 2016 Windows" is the most restrictive, as it does not cover any other type of installation, while the entitlement for "Microsoft Word 2019 Windows" covers this installation (via downgrade rights) as well as installations of "Microsoft Word 2019 Windows". But other reconciliation techniques may be used.

VI. EXAMPLE SOFTWARE APPLICATION SUITES AND ENTITLEMENTS THERETO

As noted above, a software application suite (or just a "suite") may include two or more software applications that have related functionality, are thematically linked, interface with one another, or share common user interface components. An example of a suite is MICROSOFT® Office 2016, which includes Word, the spreadsheet application EXCEL®, the presentation application POWERPOINT®, and the note-taking application ONENOTE®. Various editions of MICROSOFT® Office 2016 may include other software applications, such as email, publishing, and database applications. For example, MICROSOFT® Office 2016 home edition may include Word, EXCEL®, POWERPOINT®, and ONENOTE®, and may be represented by the software model "Microsoft Office 2016 Home". Similarly, MICROSOFT® Office 2016 standard edition may include those applications as well as email and publishing applications, and may be represented by the software model "Microsoft Office 2016 standard".

Entitlements can apply individually to the software applications in a suite, or to the entire suite itself. In the latter case, an entitlement to "Microsoft Office 2016 Home" may cover one installation each of Word, EXCEL®, POWERPOINT®, and ONENOTE®.

Suites add yet another level of complexity to reconciliation, especially when suites can contain other suites. For example, consider a situation in which Suite A contains a number of software applications, including the software applications making up Suite B. Enterprises may license Suite A as a whole (and thus obtain licenses to all of the software applications thereof) in order to reduce licensing complexity and cost. In order for reconciliation to operate efficiently in this scenario, such a procedure should be aware of the software applications of Suite B (so that a license to Suite B can cover these applications) as well as the fact that Suite A contains Suite B. Failing to recognize these relationships may result in reconciliation assigning licenses to installations in a sub-optimal fashion that is unnecessarily complex or expensive.

Thus, a reconciliation algorithm may seek to assign, if it can, suite entitlements to computing devices having installed thereon as many software applications making up the suite as possible. Leftover suite entitlements may be assigned to computing devices having installed thereon fewer than all software applications that make up the suite.

Furthermore, suites may also have downgrade rights associated with their entitlements and/or software models. Thus, the suite "Microsoft Office 2019 Standard" may also be assigned to installations of "Microsoft Office 2019 Home" and "Microsoft Office 2016 Standard". Likewise, "Microsoft Office 2016 Standard" may also be assigned to installations of "Microsoft Office 2016 Home" and "Microsoft Office 2013 Standard". Other examples exist.

Additionally, suites may contain other suites, resulting in entitlements to higher-level suites including the right to use the lower-level suites therein. As an example, the MICROSOFT® Core Infrastructure Server (CIS) suite contains the MICROSOFT® WINDOWS® Server operating system as well as MICROSOFT® System Center (SC) suite. The latter is a suite of applications related to deployment and management of enterprise software, and may contain at least some of the software applications Configuration Manager, Data Protection Manager, Endpoint Protection, Operations Manager, Orchestrator, Service Manager, and Virtual Machine Manager.

Figure 6:
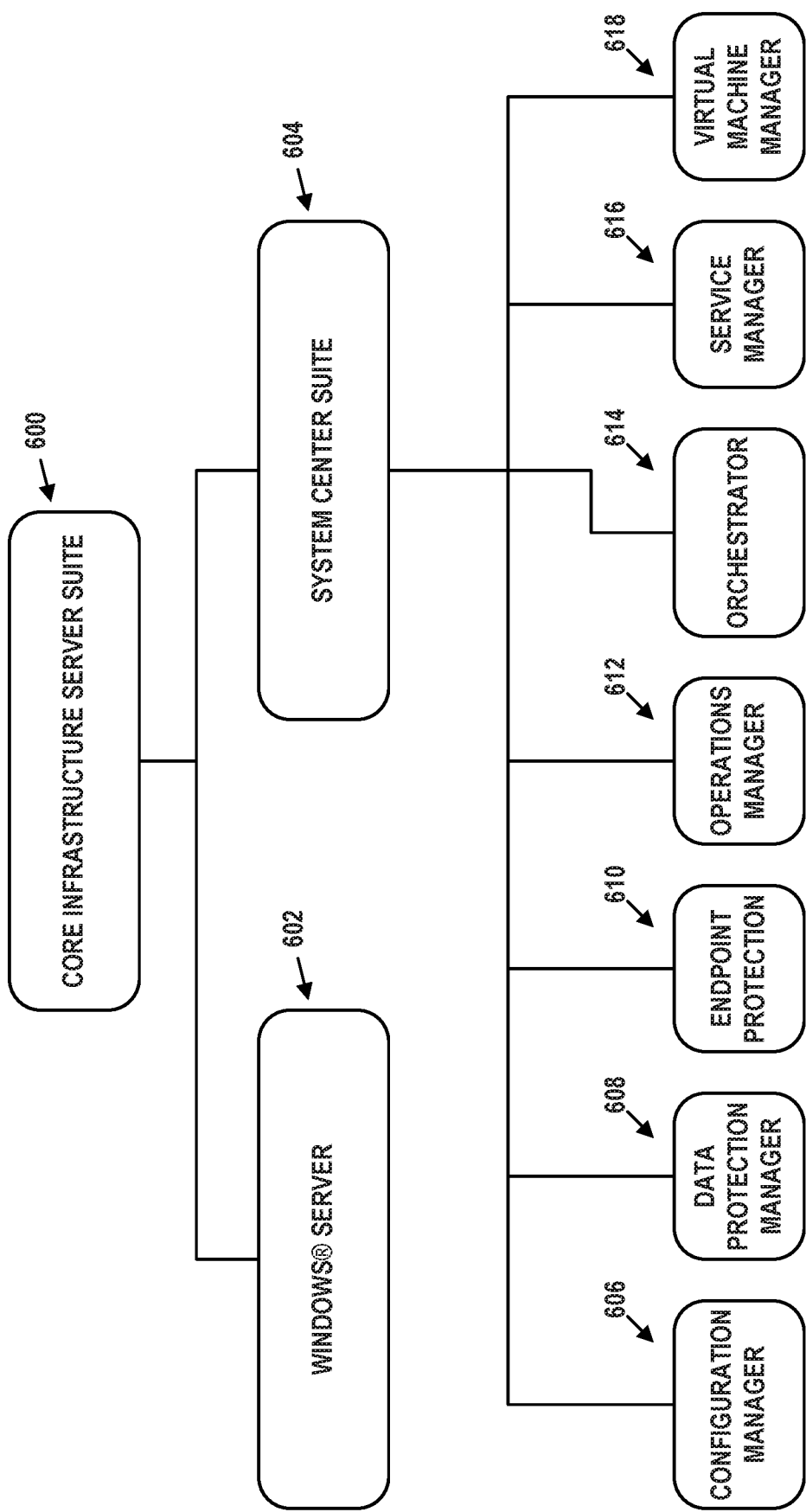
FIG. 6 depicts a suite of software applications containing another suite of software applications, in accordance with example embodiments.

A visual representation of the core infrastructure server suite hierarchy is shown in FIG. 6. Core Infrastructure Server suite 600 includes WINDOWS® Server 602 and System Center suite 604. System Center suite 604 includes, in turn, Configuration Manager 606, Data Protection Manager 608, Endpoint Protection 610, Operations Manager 612, Orchestrator 614, Service Manager 616, and Virtual Machine Manager 618.

One of the factors that make entitlements even more difficult to assign with multi-level suites is that the existence of the suites may have to be inferred from deployments of their constituent software applications. For example, if an enterprise has an entitlement to Core Infrastructure Server suite 600 and WINDOWS® Server 602, the reconciliation mechanism may need to determine that both WINDOWS® Server 602 and System Center suite 604 are installed in order to assign the entitlement. This may involve, for instance, inferring the installation of System Center suite 604 from the presence of two or more of the software applications therein.

Moreover, entitlements and/or software models for suites may also be associated with downgrade rights. For example, Core Infrastructure Server suite version 2019 may have downgrade rights to Core Infrastructure Server suite 2016, and Core Infrastructure Server suite 2016 may have downgrade rights to Core Infrastructure Server suite 2013. In these or other examples, Core Infrastructure Server suite version 2019 professional edition may have downgrade rights to Core Infrastructure Server suite 2019 standard edition, and Core Infrastructure Server suite 2016 professional edition may have downgrade rights to Core Infrastructure Server suite 2016 standard edition.

Figure 7:
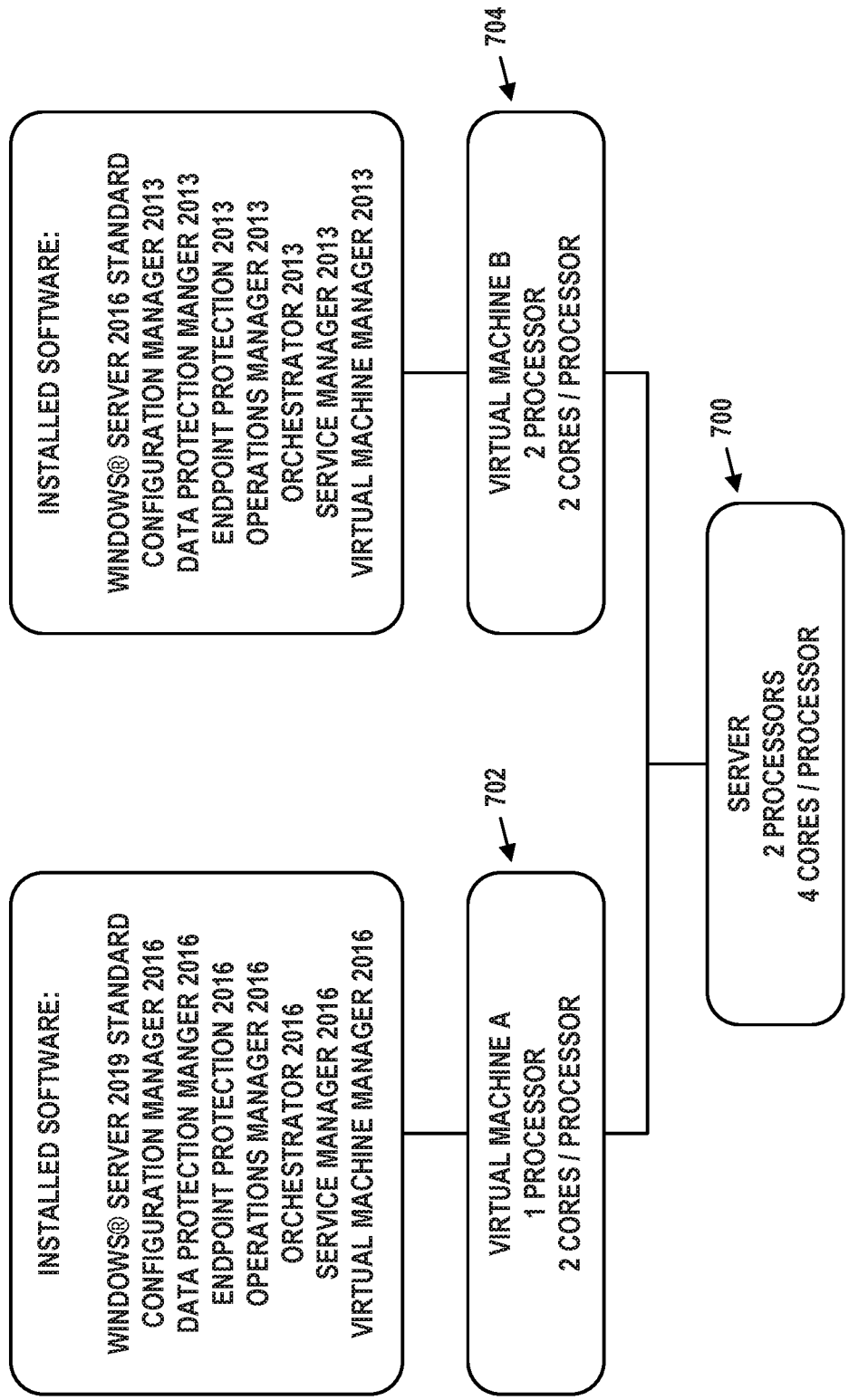
FIG. 7 depicts installations of software applications and suites, in accordance with example embodiments.

FIG. 7 provides an example of how required entitlements can be determined in the presence of suites with downgrade rights. Server 700 contains 2 processors each with 4 cores. Server 700 also executes virtual machine A 702 and virtual machine B 704. Virtual machine A 702 uses 2 cores of 1 of these processors, while virtual machine B 704 uses 2 cores per processor of 2 of these processors. Virtual machine A 702 has installed thereon WINDOWS® Server 2019 standard edition as well as the constituent software applications from System Center suite 2016. Virtual machine B 704 installed thereon WINDOWS® Server 2016 standard edition as well as the constituent software applications from System Center suite 2013.

Reconciliation mechanism may carry out the following steps for each virtual machine: (i) infer the suite(s) installed, (ii) determine the version of the suite for which entitlements are required, and (iii) verify that the entitlements or their downgrade rights cover the constituent software applications of the suite(s). For virtual machine A 702 this involves inferring that there is a Core Infrastructure Server suite installed, determining that an entitlement to Core Infrastructure Server suite 2019 is required, and verifying that the entitlement or software model for Core Infrastructure Server suite 2019 has associated downgrade rights for Core Infrastructure Core Infrastructure Server suite 2016 or System Center suite 2016. For virtual machine B 704, this involves inferring that there is a Core Infrastructure Server suite installed, determining that an entitlement to Core Infrastructure Server suite 2016 is required, and verifying that the entitlement or software model for Core Infrastructure Server suite 2016 has associated downgrade rights for Core Infrastructure Core Infrastructure Server suite 2013 or System Center suite 2013.

Thus, the reconciliation procedure may determine that virtual machine A 702 requires an entitlement for 1 copy of Core Infrastructure Server suite 2019, and virtual machine B 704 requires an entitlement for 1 copy of Core Infrastructure Server suite 2016. In the case that Core Infrastructure Server suite 2019 has downgrade rights to Core Infrastructure Server suite 2016, entitlements for 2 copies of Core Infrastructure Server suite 2019 may be used instead. In some cases, more entitlements may be needed if the number of processors and cores per processor are taken into consideration.

VII. ASSIGNING ENTITLEMENTS TO INSTALLATIONS OF SOFTWARE APPLICATION SUITES

The embodiments herein address the complex issues described above by providing a framework for assigning entitlements to installations of software application suites. In short, the framework involves constructing a tree or tree-like data structure representing a software application suite hierarchy and structured lists representing downgrade rights from particular versions and/or editions of a suite to one or more other versions and/or editions of the suite. Once such a tree is constructed, it may be used to derive an ordering of suites from most restrictive to least restrictive in terms of both position in the software application suite hierarchy and downgrade rights. The suites may then be considered in order when assigning associated entitlements to installations of the suites.

This section will provide a general description of this process, and then address a specific example involving MICROSOFT® Core Infrastructure Server suite. Advantageously, the embodiments herein can operate with an arbitrarily deep nesting of suites as well as any sequence of downgrade rights.

A. General Description

Suppose that there is a software application suite A that contains software application suite B, software application C, and software application suite D. Software application suite B further contains software applications E and F, and software application suite D further contains software applications G and H. This arrangement can be represented as a tree, such as tree 800 of FIG. 8A.

Tree 800 depicts suites A, B, and D with shading, and all other non-suite software applications without shading. The structure of tree 800 reflects the definitions above. Software application suite A has a height of 2, whereas its suite constituents (software application suite B and software application suite D) have a height of 1. Non-suite constituent software application C has a height of 0. These heights are shown to the left of tree 800. The remaining leaf nodes represent software applications that are constituents of either software application suite B or software application suite D, and also have a height of 0. The heights of each of the suites in tree 800 are shown in table 802.

Suppose further that the software models for each of the suites are associated with downgrade rights to the respective previous release. Thus, suite A 2019 has downgrade rights to suite A 2018, suite B 2019 has downgrade rights to suite B 2018, and suite D 2019 has downgrade rights to suite D 2018. These downgrade rights are represented in structured lists 804.

For example, suite A 2019 is defined to have downgrade rights all versions in the square brackets, in this case suite A 2018. A more general instance of such a structured list might take the form of {A: 2019: [A: 2018, A: 2017, A:2016], A: 2016 [A:2013, A:2012]}. This expression indicates that suite A 2019 has downgrade rights to suite A 2018, suite A 2017, and suite A 2016, while suite A 2016 has downgrade rights to suite A 2013 and suite A 2012. Notably, downgrade rights can alternatively or additionally include edition-based or edition-and-release-based downgrade rights.

In some implementations, each of structured lists 804 may be represented as trees. Regardless of representation, these structured lists may be referred to or incorporated in their corresponding nodes in tree 800. Thus, tree 800 may be represented as a tree of trees, wherein non-leaf nodes represent suites and all nodes are roots of respective downgrade rights trees. In actual implementations, trees and lists can be represented in various types of data structures.

Tree 800 may be traversed in various orders (e.g., reverse height order starting from nodes with a height of 0, then nodes with a height of 1, and so on) to identify suites as well as the downgrade rights thereof. In other words, installations of software applications are identified, and then the suites to which they belong are identified. When a suite is part of another suite, the suite with the lower height value is identified first. Table 802 can be expanded to represent the software models of these suites and the software models of the related suite to which the downgrade rights apply.

Figure 8B:
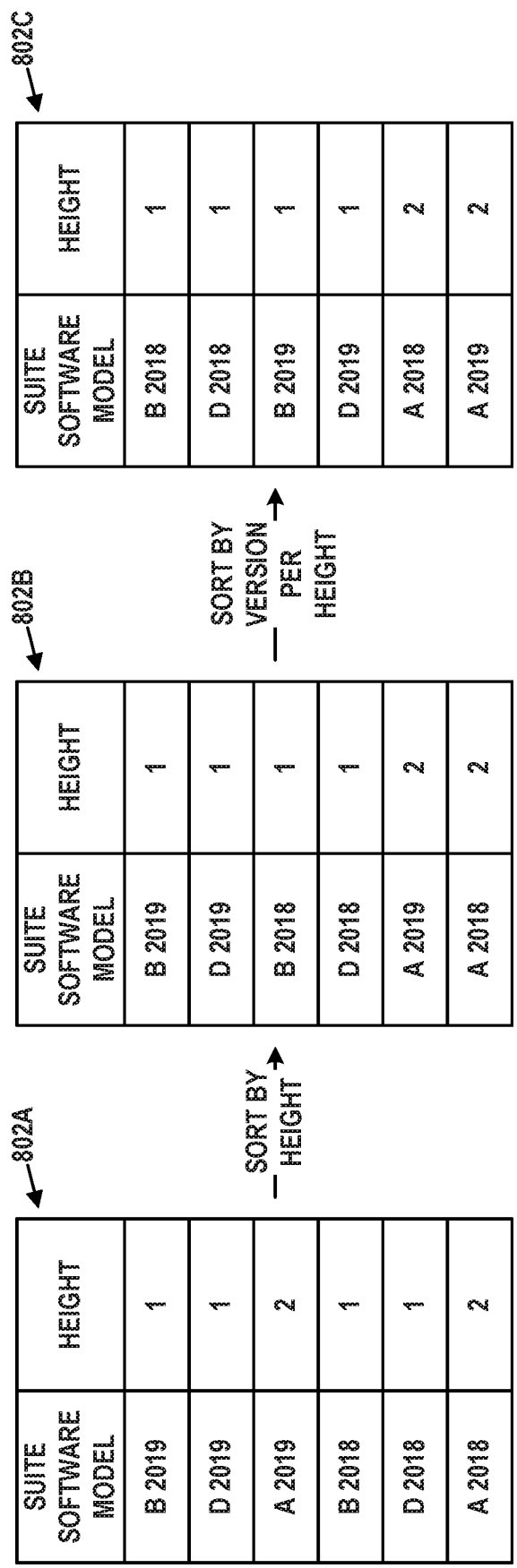
FIG. 8B depicts sorting a list of suites per version and height in the tree of FIG. 8A, in accordance with example embodiments.

As shown in FIG. 8B, table 802A includes the software models from table 802 (and may be considered an expansion of table 802), but with designations of their respective versions and heights in tree 800. Table 802A can be generated using various traversals of tree 800. Table 802A may be sorted by height (from lowest to highest) to form table 802B. Thus, in table 802B, all suites with a height of 1 appear before all suites with a height of 2. Each set of suites with the same height in table 802B may then be sorted by version (from lowest to highest or otherwise in accordance with the most restrictive to the least restrictive downgrade rights) to form table 802C. Alternatively, the suites may be sorted by version then by height. Regardless, in table 802C, all suites with a height of 1 are sorted in increasing order of release, and all suites with a height of 2 are also sorted in increasing order of release.

Table 802C represents a listing of software models in the order (from top to bottom) that they should be considering during reconciliation. Thus, for an install that is identified as or inferred to be a suite, an attempted match is made with the software model for suite B 2018, then the software model for suite D 2018, and so on until either a match is found or the software model for suite A 2019 is reached. If there is a match, an entitlement for the matched software model may be assigned to the installation. Advantageously, this will result in the most restrictive entitlement assignments, which generally leads to a more efficient overall assignment of entitlements to installations.

B. Core Infrastructure Server Suite Example

Figure 9A:
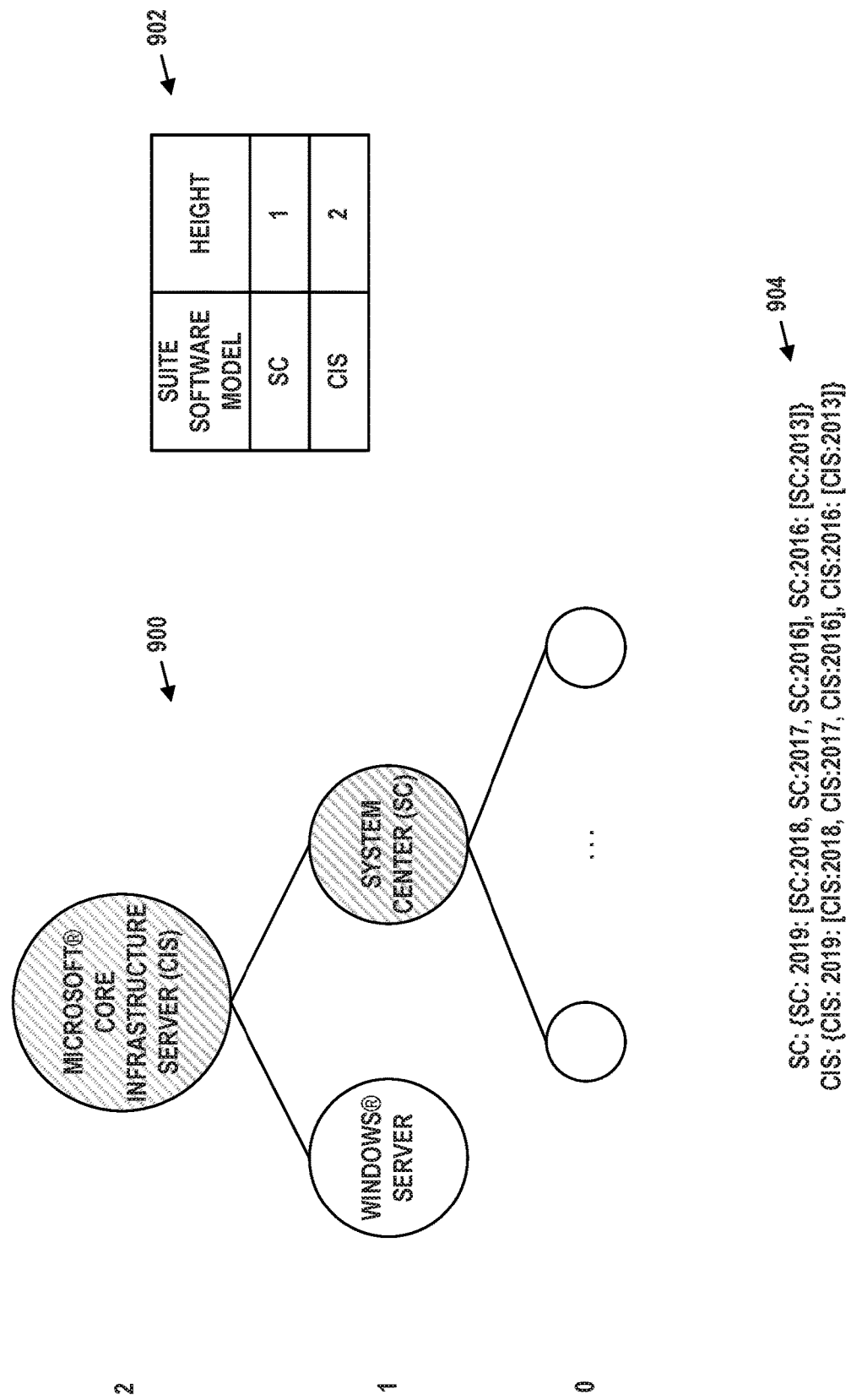
FIG. 9A depicts another nested suite of suites as a tree along with associated downgrade rights, in accordance with example embodiments.

In accordance with prior discussion, MICROSOFT® Core Infrastructure Server suite (referred to in FIGS. 9A and 9B and their accompanying description as "CIS") contains WINDOWS® Server and the System Center suite (referred to in FIGS. 9A and 9B and their accompanying description as "SC"). As described above, the SC suite may further contain two or more software applications. This arrangement can be represented as a tree, such as tree 900 of FIG. 9A. Notably, the constituent software applications of SC are summarized for sake of simplicity rather than explicitly identified.

Tree 900 depicts the CIS and SC suites with shading, and all other non-suite software applications without shading. The CIS suite has a height of 2, whereas the SC suite has a height of 1. These heights are shown to the left of tree 900. The heights of each of the suites in tree 900 are also shown in table 902.

As depicted by structured lists 904, the SC suite has downgrade rights from the 2019 version to the 2018, 2017, and 2016 versions, while the 2016 version of the SC suite has downgrade rights to the 2013 version. Similarly, the CIS suite has downgrade rights from the 2019 version to the 2018, 2017, and 2016 versions, while the 2016 version of the CIS suite has downgrade rights to the 2013 version. In some embodiments, structured lists 904 may include downgrade rights by edition as well.

As shown in FIG. 9B, table 902A includes the software models from table 902, but with designations of their respective versions and heights. Table 902A can be generated using various traversals of tree 900. Table 902A may be sorted by height (from lowest to highest) to form table 902B. Thus, in table 902B, all suites with a height of 1 appear before all suites with a height of 2. Each set of suites with the same height in table 902B may then be sorted by version (from lowest to highest or otherwise in accordance with the most restrictive to the least restrictive downgrade rights) to form table 902C. Alternatively, the suites may be sorted by version then by height. Thus, in table 902C, all suites with a height of 1 are sorted in increasing order of release, and all suites with a height of 2 are also sorted in increasing order of release.

Table 902C represents a listing of software models in the order (from top to bottom) that they should be considering during reconciliation. Thus, for an install that is identified as or inferred to be an SC suite (where CIS entitlements can be assigned to installations of SC suites), an attempted match is made with the software model for the SC 2013 suite, then the SC 2016 suite, and so on until either a match is found or the software model for the CIS 2019 suite is reached. If there is a match, an entitlement for the matched software model may be assigned to the installation.

This allows preferential assignment to the more restrictive suite (SC) over the less restrictive suite (CIS). Further, within each suite, preferential assignments are made to older releases over newer releases.

VIII. EXAMPLE OPERATIONS

Figure 10:
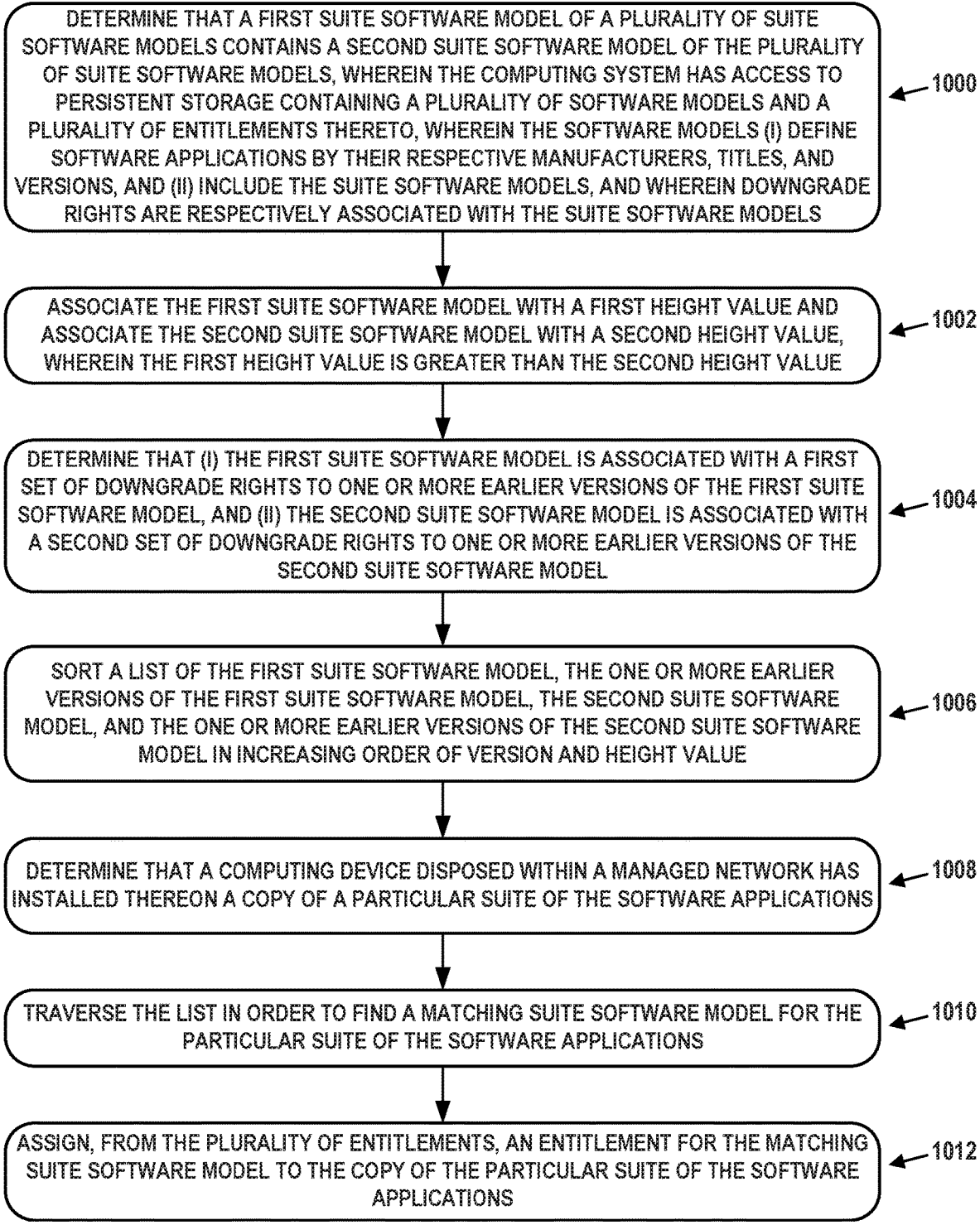
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve determining that a first suite software model of a plurality of suite software models contains a second suite software model of the plurality of suite software models, wherein the computing system has access to persistent storage containing a plurality of software models and a plurality of entitlements thereto, wherein the software models (i) define software applications by their respective manufacturers, titles, and versions, and (ii) include the suite software models, and wherein downgrade rights are respectively associated with the suite software models.

Block 1002 may involve associating the first suite software model with a first height value and associate the second suite software model with a second height value, wherein the first height value is greater than the second height value. Both height values may represent, for example, the respective suite's vertical level in a tree of downgrade rights.

Block 1004 may involve determining that (i) the first suite software model is associated with a first set of downgrade rights to one or more earlier versions of the first suite software model, and (ii) the second suite software model is associated with a second set of downgrade rights to one or more earlier versions of the second suite software model.

Block 1006 may involve sorting a list of the first suite software model, the one or more earlier versions of the first suite software model, the second suite software model, and the one or more earlier versions of the second suite software model in increasing order of version and height value.

Block 1008 may involve determining that a computing device disposed within a managed network has installed thereon a copy of a particular suite of the software applications.

Block 1010 may involve traversing the list in order to find a matching suite software model for the particular suite of the software applications.

Block 1012 may involve assigning, from the plurality of entitlements, an entitlement for the matching suite software model to the copy of the particular suite of the software applications.

In some embodiments, determining that the first suite software model contains the second suite software model comprises: (i) building a tree that represents a hierarchical arrangement of the first suite software model and the second suite software model, wherein the first height value and the second height value represent levels in the tree; and (ii) determining that the first suite software model is represented as a parent of the second suite software model in the tree. In these embodiments, the second suite of software applications (associated with the second suite software model) is a member of the first suite of software applications (associated with the first suite software model). There can be further levels of suites defined in this fashion (e.g., 3, 4, and 5 levels of suites).

In some embodiments, determining that the first suite software model is associated with the first set of downgrade rights, and the second suite software model is associated with the second set of downgrade rights comprises: (i) building a first tree representing the first set of downgrade rights, wherein the first suite software model is represented by a first root node of the first tree and the one or more earlier versions of the first suite software model are represented by direct or indirect children of the first root node; and (ii) building a second tree representing the first set of downgrade rights, wherein the second suite software model is represented by a second root node of the second tree and the one or more earlier versions of the second suite software model are represented by direct or indirect children of the second root node.

In some embodiments, sorting the list comprises sorting the list in order of height value, and then sorting, per each height value, the list in order of version. Thus, all suites with a height value of 1 are sorted in increasing order of version and appear in the list before all suites with a height value of 2, which are also sorted in increasing order of version.

In some embodiments, sorting the list comprises sorting the list in order of version, and then sorting the list in order of height value.

In some embodiments, determining that the computing device has installed thereon the copy of the particular suite of the software applications comprises while remotely accessing the computing device, searching the computing device for installed software applications.

In some embodiments, determining that the computing device has installed thereon the copy of the particular suite of the software applications comprises determining that the computing device has installed thereon copies of at least some constituent software applications of the particular suite of the software applications.

In some embodiments, traversing the list in order to find the matching suite software model comprises: traversing the list in order to find the matching suite software model; and determining that the plurality of entitlements contains one or more entitlements for the matching suite software model, wherein the entitlement assigned to the matching suite software model is of the one or more entitlements for the matching suite software model.

In some embodiments, traversing the list in order to find the matching suite software model comprises determining the matching suite software model to be an earliest suite software model, in the list as ordered, which matches the particular suite of the software applications.

In some embodiments, the matching suite software model for the particular suite of the software applications has a downgrade right for the particular suite of the software applications.

In some embodiments, the software models also define the software applications by their respective editions, wherein the first set of downgrade rights are also to one or more other editions of the first suite software model, and wherein the second set of downgrade rights are also to one or more other editions of the second suite software model.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a plurality of software models and a plurality of entitlements thereto, wherein the software models (i) define software applications by their respective manufacturers, titles, and versions, and (ii) include suite software models that define suites of the software applications, and wherein downgrade rights are respectively associated with the suite software models;
   a server device comprising a processor and a second persistent storage, the second persistent storage containing instructions that, when executed by the processor, cause the processor to:
   determine that a first suite software model of the suite software models contains a second suite software model of the suite software models;
   associate the first suite software model with a first height value and associate the second suite software model with a second height value, wherein the first height value is greater than the second height value;
   determine that (i) the first suite software model is associated with a first set of downgrade rights to one or more earlier versions of the first suite software model, and (ii) the second suite software model is associated with a second set of downgrade rights to one or more earlier versions of the second suite software model;
   sort a list of the first suite software model, the one or more earlier versions of the first suite software model, the second suite software model, and the one or more earlier versions of the second suite software model in increasing order of version and height value;
   remotely access a computing device disposed within a managed network;
   search the remotely accessed computing device for installed software applications to determine that the computing device has installed thereon a copy of a particular suite of the software applications;
   traverse the list in order to find a matching suite software model for the particular suite of the software applications; and
   assign, from the plurality of entitlements, an entitlement for the matching suite software model to the copy of the particular suite of the software applications.

2. The system of claim 1, wherein determining that the first suite software model contains the second suite software model comprises:
   building a tree that represents a hierarchical arrangement of the first suite software model and the second suite software model, wherein the first height value and the second height value represent levels in the tree; and determining that the first suite software model is represented as a parent of the second suite software model in the tree.

3. The system of claim 1, wherein determining that (i) the first suite software model is associated with the first set of downgrade rights, and (ii) the second suite software model is associated with the second set of downgrade rights comprises:

building a first tree representing the first set of downgrade rights, wherein the first suite software model is represented by a first root node of the first tree and the one or more earlier versions of the first suite software model are represented by direct or indirect children of the first root node; and building a second tree representing the first set of downgrade rights, wherein the second suite software model is represented by a second root node of the second tree and the one or more earlier versions of the second suite software model are represented by direct or indirect children of the second root node.

4. The system of claim 1, wherein sorting the list comprises:

sorting the list in order of height value, and then sorting, per each height value, the list in order of version.

5. The system of claim 1, wherein sorting the list comprises:

sorting the list in order of version, and then sorting the list in order of height value.

6. The system of claim 1, wherein searching the remotely accessed computing device for installed software applications to determine that the computing device has installed thereon the copy of the particular suite of the software applications comprises:

determining that the computing device has installed thereon copies of at least some constituent software applications of the particular suite of the software applications.

7. The system of claim 1, wherein traversing the list in order to find the matching suite software model comprises:

traversing the list in order to find the matching suite software model; and determining that the plurality of entitlements contains one or more entitlements for the matching suite software model, wherein the entitlement assigned to the matching suite software model is of the one or more entitlements for the matching suite software model.

8. The system of claim 1, wherein traversing the list in order to find the matching suite software model comprises:

determining the matching suite software model to be an earliest suite software model, in the list as ordered, which matches the particular suite of the software applications.

9. The system of claim 1, wherein the matching suite software model for the particular suite of the software applications has a downgrade right for the particular suite of the software applications.

10. The system of claim 1, wherein the software models also define the software applications by their respective editions, wherein the first set of downgrade rights are also to one or more other editions of the first suite software model, and wherein the second set of downgrade rights are also to one or more other editions of the second suite software model.

11. A computer-implemented method comprising:

determining, by a server device, that a first suite software model of a plurality of suite software models contains a second suite software model of the plurality of suite software models, wherein the server device has access to persistent storage containing a plurality of software models and a plurality of entitlements thereto, wherein the software models (i) define software applications by their respective manufacturers, titles, and versions, and (ii) include the suite software models, and wherein downgrade rights are respectively associated with the suite software models;

associating, by the server device, the first suite software model with a first height value and associate the second suite software model with a second height value, wherein the first height value is greater than the second height value;

determining, by the server device, that (i) the first suite software model is associated with a first set of downgrade rights to one or more earlier versions of the first suite software model, and (ii) the second suite software model is associated with a second set of downgrade rights to one or more earlier versions of the second suite software model;

sorting, by the server device, a list of the first suite software model, the one or more earlier versions of the first suite software model, the second suite software model, and the one or more earlier versions of the second suite software model in increasing order of version and height value;

remotely accessing, by the server device, a computing device disposed within a managed network;

searching the remotely accessed computing device for installed software applications to determine that the computing device has installed thereon a copy of a particular suite of the software applications;

traversing, by the server device, the list in order to find a matching suite software model for the particular suite of the software applications; and assigning, by the server device and from the plurality of entitlements, an entitlement for the matching suite software model to the copy of the particular suite of the software applications.

12. The computer-implemented method of claim 11, wherein determining that the first suite software model contains the second suite software model comprises:

building a tree that represents a hierarchical arrangement of the first suite software model and the second suite software model, wherein the first height value and the second height value represent levels in the tree; and determining that the first suite software model is represented as a parent of the second suite software model in the tree.

13. The computer-implemented method of claim 11, wherein determining that (i) the first suite software model is associated with the first set of downgrade rights, and (ii) the second suite software model is associated with the second set of downgrade rights comprises:

building a first tree representing the first set of downgrade rights, wherein the first suite software model is represented by a first root node of the first tree and the one or more earlier versions of the first suite software model are represented by direct or indirect children of the first root node; and building a second tree representing the first set of downgrade rights, wherein the second suite software model is represented by a second root node of the second tree and the one or more earlier versions of the second suite software model are represented by direct or indirect children of the second root node.

14. The computer-implemented method of claim 11, wherein searching the remotely accessed computing device for installed software applications to determine that the computing device has installed thereon the copy of the particular suite of the software applications comprises:

determining that the computing device has installed thereon copies of at least some constituent software applications of the particular suite of the software applications.

15. The computer-implemented method of claim 11, wherein traversing the list in order to find the matching suite software model comprises:

traversing the list in order to find the matching suite software model; and determining that the plurality of entitlements contains one or more entitlements for the matching suite software model, wherein the entitlement assigned to the matching suite software model is of the one or more entitlements for the matching suite software model.

16. The computer-implemented method of claim 11, wherein traversing the list in order to find the matching suite software model comprises:

determining the matching suite software model to be an earliest suite software model in the list as ordered that matches the particular suite of the software applications.

17. The computer-implemented method of claim 11, wherein the matching suite software model is for the particular suite of the software applications has a downgrade right for the particular suite of the software applications.

18. An article of manufacture including a non-transitory computer-readable medium, having stored thereon program instructions that, upon execution by a computing system, cause the computing system to perform operations comprising:

determining that a first suite software model of a plurality of suite software models contains a second suite software model of the plurality of suite software models, wherein the computing system has access to persistent storage containing a plurality of software models and a plurality of entitlements thereto, wherein the software models (i) define software applications by their respective manufacturers, titles, and versions, and (ii) include the suite software models, and wherein downgrade rights are respectively associated with the suite software models;

associating the first suite software model with a first height value and associate the second suite software model with a second height value, wherein the first height value is greater than the second height value;

determining that (i) the first suite software model is associated with a first set of downgrade rights to one or more earlier versions of the first suite software model, and (ii) the second suite software model is associated with a second set of downgrade rights to one or more earlier versions of the second suite software model;

sorting a list of the first suite software model, the one or more earlier versions of the first suite software model, the second suite software model, and the one or more earlier versions of the second suite software model in increasing order of version and height value;

remotely accessing a computing device disposed within a managed network;

searching the remotely accessed computing device for installed software applications to determine that the computing device has installed thereon a copy of a particular suite of the software applications;

traversing the list in order to find a matching suite software model for the particular suite of the software applications; and assigning, from the plurality of entitlements, an entitlement for the matching suite software model to the copy of the particular suite of the software applications.

19. The article of manufacture of claim 18, wherein traversing the list in order to find the matching suite software model comprises:

traversing the list in order to find the matching suite software model; and determining that the plurality of entitlements contains one or more entitlements for the matching suite software model, wherein the entitlement assigned to the matching suite software model is of the one or more entitlements for the matching suite software model.

20. The article of manufacture of claim 18, wherein traversing the list in order to find the matching suite software model comprises:

determining the matching suite software model to be an earliest suite software model, in the list as ordered, which matches the particular suite of the software applications.

* * * * *